United States Patent Office 3,320,229
Patented May 16, 1967

3,320,229
COMPLEXES OF GUANIDINES WITH COMPLETELY HALOGENATED ACETONES
Karoly Szabo, Pleasantville, N.Y., and Ashley H. Freiberg, Santa Clara, Calif., assignors to Stauffer Chemical Company, New York, N.Y., a corporation of Delaware
No Drawing. Filed Aug. 26, 1963, Ser. No. 304,607
18 Claims. (Cl. 260—96.5)

This invention relates to chemical complexes of guanidine or guanidine derivatives with a completely halogenated acetone and to their preparation. The invention also contemplates fungicidal compositions containing as the active component thereof at least one of the aforesaid complexes.

This is a continuation-in-part of my copending application filed May 1, 1962, Ser. No. 191,432, abandoned as of the filing of the instant application.

The present invention encompasses a new class of compounds which were discovered as the reaction product resulting from the chemical combination of a nitrogenous organic base of the guanidine type with a fully halogenated acetone in which the halogen atoms are fluorine or a combination of fluorine and chlorine and at least 3 fluorine atoms are present in the fully halogenated ketone. Although their structure has not as yet been fully elucidated, the compounds are apparently molecular addition complexes wherein the proportion of organic base to halogenated acetone is in the ratio of small whole numbers. Pointing toward the aforesaid structural hypothesis is the fact that the formation of the compounds has never been observed to be accompanied by secondary products as is characteristic of metathetical and substitution reactions. That the addition complexes are distinct entities having a definite chemical composition is supported by the consistent analytical data and sharp melting points of the purified products.

Accordingly, the new chemical entities of the present invention can be formalistically depicted as follows:

$$\left[\begin{array}{c} CX_3 \\ C=O \\ CX'_3 \end{array}\right]_n \cdot \left[\begin{array}{c} R_1-N-C-N-R_3 \\ |\quad \|\quad | \\ R_2\ N\ R_4 \\ |\\ R \end{array}\right]$$

wherein each of the substituents R, $R_1$, $R_2$, $R_3$ and $R_4$ represents hydrogen; an alkyl radical of from 1 to 20 carbon atoms, e.g. methyl, ethyl, n-propyl, isobutyl, n-pentyl, isohexyl, n-hexyl, n-heptyl, sec.-octyl, nonyl, decyl, dodecyl, tridecyl, tetradecyl, pentadecyl, hexadecyl, heptadecyl, octadecyl, and the like; a cycloalkyl radical e.g. cyclopentyl, cyclohexyl, etc.; a benzyl radical; a phenethyl radical; an aryl radical of the benzene and naphthalene series; said radicals having such optional substituents as chlorine, bromine, fluorine, lower alkyl, lower alkoxyl, lower dialkylamino $$-NH_2;\ NH_2-\underset{\|}{C}-;\ NH_2-\underset{\|}{C}-;\ NH_2-\underset{\|}{C}-$$
$$\quad\quad\quad\quad\quad S\quad\quad\quad\quad O\quad\quad\quad\quad NH$$

and —CN, and the like, it being provided that the number of non-hydrocarbon substituents attached to the same nitrogen atom does not exceed 1, X and X' are halogen atoms as represented by chlorine and fluorine there always being at least 3 fluorine atoms present and $n$ is an integer of from 1 to 2.

Structures falling within the ambit of the general formula include the addition complexes of completely halogenated acetone with various guanidine derivatives as below set forth. The invention is moreover illustrated by the examples which are described elsewhere herein.

Compound 1    $H_2N-\underset{\|}{C}-NH_2$
                    $NH$

Compound 2    $H_5C_2NH-\underset{\|}{C}-NH_2$
                    $NH$

Compound 3

$H_3C-\langle\ \rangle-NH-\underset{\|}{C}-NH-\langle\ \rangle-CH_3$
                $N$
                $|$
            $\langle\ \rangle$
                $|$
               $CH_3$ Compound 4    $\langle\ \rangle-\underset{|}{N}-\underset{\|}{C}-NH-\langle\ \rangle$
                      $H\quad NH$ Compound 5    $\langle\ \rangle-CH_2NH-\underset{\|}{C}-NHCH_2-\langle\ \rangle$
                              $NH$ Compound 6    $n-H_9C_4-NH-\underset{\|}{C}-NH-C_4H_9-n$
                              $NH$ Compound 7    $(H_5C_2)_2=N-\underset{\|}{C}-N=(C_2H_5)_2$
                          $NC_2H_5$ Compound 8    $H_{17}C_8-NH-\underset{\|}{C}-NHC_2H_5$
                            $NC_2H_5$ Compound 9    $\langle\ \rangle-NH-\underset{\|}{C}-NH-\langle\ \rangle$
                        $NC_{12}H_{25}$ Compound 10   $H_{37}C_{18}-NH-\underset{\|}{C}-NH-C_{18}H_{37}$
                            $NH$ Compound 11   $\langle\ \rangle-CH_2CH_2-NH-\underset{\|}{C}-NH_2$
                                    $NH$ Compound 12   $\langle\ \rangle-NH-\underset{\|}{C}-NH-\underset{\|}{C}-NH_2$
                          $NH\quad\ O$ Compound 13   $\langle\ \rangle-NH-\underset{\|}{C}-NH-\underset{\|}{C}-NH_2$
                          $NH\quad\ S$ Compound 14   $\langle\ \rangle-NH-\underset{\|}{C}-NH-\underset{\|}{C}-NH_2$
                        $NC_2H_5\quad NH$ In general, the compounds are prepared by bringing together the completely halogenated acetone and a guanidine component of the formula:

$$R_1-N-\underset{\|}{C}-N-R_3$$
$$\ \ R_2\ N\ R_4$$
$$\quad\ \ |$$
$$\quad\ \ R$$

wherein R, $R_1$, $R_2$, $R_3$ and $R_4$ have the values as above defined. The reaction is conveniently carried out in the presence of a normally liquid organic solvent of which suitable examples are the lower saturated water soluble alcohols and ketones, e.g. methanol, ethanol, n-propanol, acetone, methyl ethyl ketone and the like. In some instances the guanidine component is obtained or purchased in the form of its salts, i.e. carbonate, hydrochloride, etc., in which case the free base can be conveniently generated in situ by treating the guanidine salt with an alkali such as an alkali metal hydroxide or lower alkoxide.

It has been our experience that the reactants combine in simple molar proportions, the ratio of which is that of small whole numbers, there being at least one molecule of completely halogenated acetone per molecule of the guanidine reactant In this connection, the number of guanyl radicals in the guanidine appears to be a significant factor since at least one guanyl group is required to bind one molecule of the halogenated acetone whereas two guanyl radicals per guanidine, e.g. a biguanide derivative, are necessary in order to bind two moles of halogenated acetone. However, it does not necessarily follow that addition complexes of polyguanylguanidines are formed having a plurality of halogenated moities since initial introduction of halogenated ketone may sufficiently deactivate any remaining guanyl groups thereby precluding further complex formation.

As previously pointed out, the addition complexes of this invention exhibit fungicidal properties and can therefore be utilized as the active component or toxicant in the formulation of biocidal compositions and are particularly effective in combating fungi of the type that infect plants. In this connection, the compounds have proven highly effective against bean rust, giving 100% protection in many instances when applied to bean plants at a concentration in the order of only a few p.p.m. Moreover, the toxicants did not cause any significant phytotoxic damage to the host plant.

Another extremely useful and unexpected asset of the herein contemplated addition complexes is their systemic toxicity, a feature which further increases the utility and versatility of the compounds. As those skilled in the art are aware, a systemic biocide is taken up internally by the organism to which it is applied and lodges in the living tissues while still retaining toxicological properties. When used to protect plants such as food crops systemic toxicants have the advantage of not being subject to weathering or wash off by rain since they are confined within the interstices of the plant tissues which are thus internally immunized against the attack of fungi and similar harmful microorganisms.

In carrying out systemic fungicidal tests, 60 ml. of a solution containing the compound undergoing evaluation is diluted to 50 p.p.m. and then placed in small tubes. A Pinto bean plant is inserted in each tube using a cotton plug to support the seedling and also to retard evaporation. After 48 hours, two plants are inoculated with bean rust. Comparison between the treated and untreated plants is then made and the results evaluated. In these tests, the compound of Example 2, a typical representative gave 100% control at a concentration of 0.75 p.p.m. which was the lowest concentration tested. Manifestly, this compound exhibits an unusually high degree of systemic fungicidal activity.

Preparations suitable for fungicide applications may be prepared in the form of dusts or sprays. The completely halogenated acetone guanidine complex may be combined with a finely divided solid carrier of which talc, diatomaceous earth, pyrophyllite, hydrated silica, clay and bentonite are typical examples. In preparing dusts, the active component normally comprises about 1 to 15% of the total mixture. Moreover, it is a common practice to employ wetting agents to facilitate dispersing the active material when the dusts are added to water. Typically, a wettable powder comprises 20 to 50% of the toxicant, 45 to 75% of one of the aforementioned finely divided solids, 1 to 5% of wetting agent, and 1 to 3% of a dispersing agent. Exemplary wetting agents are the sodium alkylbenzenesulfonates, sodium dodecyl sulfate, and the non-ionic polyethers as exemplified by the alkylphenoxypolyethoxyethanols. In use, the wettable powder is stirred up in water and the resultant liquid sprayed on plants for protection against fungus diseases. Another common procedure for incorporating the toxicants of the invention in a form suitable for application to plants consists in dissolving the component in an organic solvent such as xylene, toluene, ethylene dichloride followed by emulsifying the resulting solution in water in the presence of a dispersing agent.

For specific instructions and directions in preparing the aforementioned complexes, reference is now made to the following examples which are inserted only for the purpose of illustrating the invention. It will be appreciated by those having skill in the art to which the invention pertains that various ramifications and modifications can be effected without departing from the spirit and scope thereof.

*Example 1*

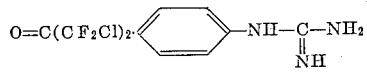

19.7 (0.1 mole) of phenylguanidine carbonate was suspended in 50 ml. of alcohol and the free base was liberated by adding to the mixture a solution of 2.3 g. of sodium in 70 ml. of absolute alcohol. The reaction was exothermic which may necessitate outside cooling. After stirring for 1 hour at room temperature, 19.9 g. (0.1 mole) of sym-dichlorotetrafluoroacetone was added while maintaining vigorous agitation. After 10 minutes the reaction mixture was filtered and the filtrate concentrated in vacuo, leaving a syrupy residue. The crude product was dissolved in 50 ml. of benzene and the organic solution washed several times with water. A white solid precipitates out and was filtered off and dried. The white product, which weighed 27 g., melted at 110° C. with decomposition and the chemical analysis was in conformity with the above depicted structure.

The guanidines used as intermediates in this and the following examples are in most instances known compounds. In general, they can be prepared by reacting a thiourea component with an alkalating agent to form a thiouronium salt which is treated with an organic amine having at least one hydrogen attached to the nitrogen atom and isolating the resulting guanidine derivative. For further details and specific instructions on the preparation of the guanidine intermediates, reference is made to the various technical and chemical literature sources.

*Example 2*

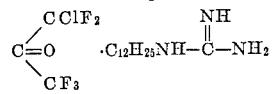

15.0 g. of dodecylguanidine acetate was placed in a reaction flask equipped with a stirrer, thermometer and dropping funnel from which was added a solution of 2.9 g. of sodium methoxide in 70 ml. of absolute alcohol. After the addition was completed, the reaction was stirred for 30 minutes at room temperature followed by the introduction of 11.0 g. of monochloropentafluoroacetone the addition of which caused a temperature rise to 55° C. After assuming room temperature, the reaction mixture was poured into 250 ml. of water and after standing about 1 hour at room temperature a white precipitate had formed. The solid was removed by filtration and dried in the open air. The yield amounted to 20.0 g. and the purified material melted at 88° C. Chemical and instrumental analysis were in consonance with the above given structure.

*Example 3*

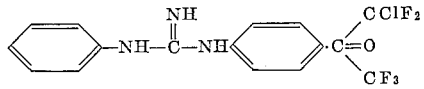

10.6 g. of diphenylguanidine was suspended in 40 ml. of methylene dichloride and to the resulting suspension was introduced 10.0 g. of chloropentafluoro acetone. After the introduction of the halogenated acetone was completed and the mildly exothermic reaction had subsided, the precipitated reaction product was separated from the reaction media and isolated as a white solid. The melting point was 138° C. and the yield amounted to 19.5 g.

Using the procedure as given in Example 1 complexes of completely halogenated acetone were prepared from the guanidines listed below. It is to be noted that in Example 11a 2 molecules of the halogenated acetone were reacted with one molecule of the guanidine component, which it will be observed, has two guanyl radicals. As previously explained, polyguanyl guanidines may react with more than one molecule of the halogenated acetone.

| Example No. | Guanidine Component | Acetone Component* | Characterization |
|---|---|---|---|
| 4 | $C_{12}H_{25}NH\cdot\overset{NH}{\underset{\|}{C}}-NH_2$ | 4FK | White solid. |
| 5 | 2-CH$_3$-C$_6$H$_4$-NH-C(=NH)-NH-C$_6$H$_4$-2-CH$_3$ | 4FK | White solid, M.P.=134° (D). |
| 6 | C$_6$H$_5$-NH-C(=NH)-NH-C(=NH)-NH$_2$ | 4FK | White solid, M.P.=118° (D). |
| 7 | C$_6$H$_5$-NH-C(=N-C$_6$H$_5$)-NH-C$_6$H$_5$ | 4FK | Yellow glassy solid, M.P.=65–70°. |
| 8 | NH$_2$-C(=NH)-NH-NH$_2$ | 4FK | White solid M.P.=130° C. |
| 9 | NH$_2$-C(=NH)-NH·CN | 4FK | White solid, M.P.=170° C. |
| 10 | C$_6$H$_5$-NH-C(=NH)-NH$_2$·C$_{17}$H$_{35}$COOH | 4FK | Brown oil, $N_D^{25}=1.4758$. |
| 11 | 2-CH$_3$-C$_6$H$_4$-NH-C(=NH)-NH-C(=NH)-NH$_2$ | 4FK | White solid. |
| 11a | [2-CH$_3$-C$_6$H$_4$-NH-C(=NH)-NH-C(=NH)-NH$_2$]$_2$ | 4FK | Yellowish viscous oil. |
| 12 | 2-thienyl-NH-C(=NH)-NH-2-thienyl | 4FK | White solid, M.P.=95° C. |
| 13 | NH$_2$-C(=NH)-NH-C(=O)-NH$_2$ | 4FK | White solid, M.P.=113° C. |
| 14 | (CH$_3$)$_2$CH-NH-C(=NH)-NH-C-NH$_2$ | 4FK | Yellow oil, $N_D^{25}=1.4205$. |
| 15 | $C_{12}H_{25}NH-\overset{NH}{\underset{\|}{C}}\cdot NH_2$ | 3FK | White solid, M.P.=119. |
| 15 | $C_{12}H_{25}NH-C\cdot NH_2$ | 3FK | White solid, M.P.=119. |
| 16 | $C_{12}H_{25}NH\cdot\overset{NH}{\underset{\|}{C}}-NH_2$ | 6FK | White solid, M.P.=63. |
| 17 | C$_6$H$_5$-NH-C(=NH)-NH-C$_6$H$_5$ | 3FK | Yellow solid, M.P.=130–133. |

[1] NOTE:

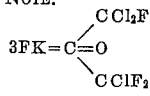

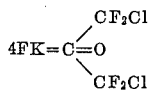

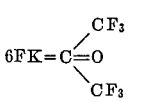

We claim:
1. A guanidine complex of completely halogenated acetone having the following formula

$$\left[\begin{array}{c} CX_3 \\ C=O \\ CX'_3 \end{array}\right]_n \quad \left[\begin{array}{c} R_1-N-C-N-R_3 \\ R_2 \; N \; R_4 \\ R \end{array}\right]$$

wherein the substituents R, $R_1$, $R_2$, $R_3$ and $R_4$ are each selected from the class consisting of hydrogen, an alkyl radical of from 1 to 20 carbon atoms; a cycloalkyl radical of from 5 to 6 carbon atoms; phenyl; benzyl; phenethyl; naphthyl; substituted-phenyl wherein said substituents are selected from the group consisting of chlorine, fluorine, bromine, lower alkyl, lower alkoxy and lower dialkylamino;

$$-NH_2; \; NH_2-C-; \; NH_2-C; \; NH_2C- \\ \quad\quad\quad\quad \parallel \quad\quad\quad \parallel \quad\quad\quad \parallel \\ \quad\quad\quad\quad O \quad\quad\quad\quad S \quad\quad\quad NH$$

and —CN; the number of non-hydrocarbon R groups attached to the same nitrogen atom does not exceed 1; X and $X^1$ are selected from the group consisting of chlorine and fluorine, there always being at least 3 fluorines present, and $n$ is an integer of from 1 to 2.

2. A guanidine complex of the following formula:

$$\text{Ph}-NH-\underset{\underset{NH}{\parallel}}{C}-NH_2 \cdot O=C(CF_2Cl)_2$$

3. A guanidine complex of the following formula:

$$C_{12}H_{25}NH \cdot \underset{\underset{NH}{\parallel}}{C}-NH_2 \cdot O=C(CF_2Cl)_2$$

4. A guanidine complex of the following formula:

$$\text{Ph}-NH-\underset{\underset{NH}{\parallel}}{C}-NH-\text{Ph}(CH_3)(CH_3) \cdot O=C(CF_2Cl)_2$$

5. A guanidine complex of the following formula:

$$\text{Ph}-NH\underset{\underset{NH}{\parallel}}{C}-NH\cdot \underset{\underset{NH}{\parallel}}{C} \cdot NH_2 \cdot O=C(CF_2Cl)_2$$

6. A guanidine complex of the following formula:

$$\text{Ph}-NH-\underset{\underset{N-Ph}{\parallel}}{C}-NH-\text{Ph} \cdot O=C(CF_2Cl)_2$$

7. A guanidine complex of the following formula:

$$NH_2-\underset{\underset{NH}{\parallel}}{C}-NH-NH_2 \cdot O=C(CF_2Cl)_2$$

8. A guanidine complex of the following formula:

$$NH_2 \cdot \underset{\underset{N}{\parallel}}{C}-NH \cdot CN \cdot O=C(CF_2Cl)_2$$

9. A guanidine complex of the following formula:

$$\text{Ph}-NH-\underset{\underset{NH}{\parallel}}{C}-NH_2 \cdot C_{17}H_{35}COOH \cdot O=C(CF_2Cl)_2$$

10. A guanidine complex of the following formula:

$$\left[\text{Ph}(CH_3)-NH-\underset{\underset{NH}{\parallel}}{C}-NH\underset{\underset{NH}{\parallel}}{C}-NH_2\right] \cdot [O=C(CF_2Cl)_2]_2$$

11. A guanidine complex of the following formula:

$$\text{(thiophene)}-NH-\underset{\underset{NH}{\parallel}}{C}-NH-\text{(thiophene)} \cdot O=C(CF_2Cl)_2$$

12. A guanidine complex of the following formula:

$$NH_2-\underset{\underset{NH}{\parallel}}{C}-NH-\underset{\underset{O}{\parallel}}{C}-NH_2 \cdot O=C(CF_2Cl)_2$$

13. A guanidine complex of the following formula:

$$(CH_3)_2CH-NH-\underset{\underset{NH}{\parallel}}{C}-NH\underset{\underset{NH}{\parallel}}{C}-NH_2 \cdot O=C(CF_2Cl)_2$$

14. A guanidine complex of the following formula:

$$\begin{array}{c} CClF_2 \\ C=O \\ CF_3 \end{array} \cdot C_{12}H_{25}NH-\underset{\underset{NH}{\parallel}}{C}-NH_2$$

15. A guanidine complex of the following formula:

$$\text{Ph}-NH-\underset{\underset{NH}{\parallel}}{C}-NH-\text{Ph} \cdot \begin{array}{c} CClF_2 \\ C=O \\ CF_3 \end{array}$$

16. A guanidine complex of the following formula:

$$C_{12}H_{25}NH-\underset{\underset{NH}{\parallel}}{C}-NH_2 \cdot \begin{array}{c} CClF_2 \\ C=O \\ CCl_2F \end{array}$$

17. A guanidine complex of the following formula:

$$C_{12}H_{25}NH-\underset{\underset{NH}{\parallel}}{C}-NH_2 \cdot \begin{array}{c} CF_3 \\ C=O \\ CF_3 \end{array}$$

18. A guanidine complex of the following formula:

$$\text{Ph}-NH-\underset{\underset{NH}{\parallel}}{C}-NH-\text{Ph} \cdot \begin{array}{c} CCl_2F \\ C=O \\ CClF_2 \end{array}$$

References Cited by the Examiner

UNITED STATES PATENTS

| | | | |
|---|---|---|---|
| 2,390,597 | 12/1945 | Law et al. | 167—30 |
| 2,548,509 | 4/1951 | Yowell | 167—30 |
| 2,768,205 | 10/1956 | Hechenbleikner | 260—565 |
| 2,959,616 | 11/1960 | Birtwell | 260—565 |

CHARLES B. PARKER, *Primary Examiner.*

JULIAN S. LEVITT, *Examiner.*

GEORGE A. MENTIS, FLOYD D. HIGEL,
*Assistant Examiners.*

UNITED STATES PATENT OFFICE
CERTIFICATE OF CORRECTION

Patent No. 3,320,229          May 16, 1967

Karoly Szabo et al.

It is hereby certified that error appears in the above numbered patent requiring correction and that the said Letters Patent should read as corrected below.

Columns 5 and 6, in the table, strike out the second Example No. 15 in its entirety; column 7, lines 55 and 56, the compound should appear as shown below instead of as in the patent:

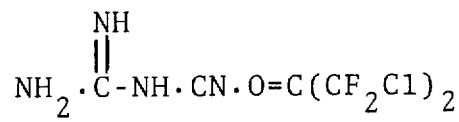

Signed and sealed this 26th day of November 1968.

(SEAL)
Attest:

Edward M. Fletcher, Jr.
Attesting Officer

EDWARD J. BRENNER
Commissioner of Patents